UNITED STATES PATENT OFFICE 2,606,124

PRINTING INK

Alfred F. Schmutzler, Teaneck, N. J., and Donald F. Othmer, Coudersport, Pa.

No Drawing. Application September 26, 1950, Serial No. 186,912

8 Claims. (Cl. 106—24)

This invention relates to printing inks, and more particularly to printing inks which harden by exposure to steam.

Printing inks which harden by the application of moisture in the form of steam or water consist of compositions made from a water-miscible liquid, such as ethylene glycol, diethylene glycol or the like, in which there is dispersed a water-insoluble binder, such as zein, a resin, and a coloring material, such as a pigment of the character of carbon black, chrome yellow, or the like, or a dyestuff. The hardening of the printed ink film is caused by exposure to steam or water. During the process of setting, the water-miscible liquid absorbs sufficient water to cause the precipitation of the binder with the pigment. Due to the nature of the process, it is necessary for the binder to be sufficiently moisture-sensitive so that the addition of water to the organic liquid causes its separation, but the binder should have an adequate tolerance for moisture so that it will not prematurely precipitate.

Usually inks made with zein are too sensitive to high humidities, such as about 50%, resulting in a breakdown on the printing press, with consequent failure of proper distribution on the rollers and consequent failure of the printing process.

In our copending application S. N. 115,552, now abandoned, filed September 13, 1949, and also in our Patent #2,482,879, it is disclosed that printing inks made by suspending coloring materials in a colloidal dispersion of from 20 to 35% of soybean protein, containing from 95% upwards of pure protein, dispersion in diethylene glycol, using 6% guanidine carbonate as the dispersing agent, and made up to an apparent viscosity of 10 to 30 poises, as described by Schmutzler and Othmer, Industrial and Engineering Chemistry, 35, 1196–1202 (1943), have a tolerance for moisture and therefore, as contrasted with zein protein inks, do not break down on the press at high humidities and satisfactorily harden when their printed films are exposed to steam. They may be used where water resistance of the printed film is not a factor of paramount importance. This soybean protein-diethylene glycol dispersion, it has been disclosed, can be used with high oil absorption pigments, such as carbon black, benzidine yellow, Prussian blue and the like.

In our copending application S. N. 115,552, filed September 13, 1949, of which this application is a continuation-in-part, it is shown that in the preparation of soybean protein dispersion in diethylene glycol in the presence of guanidine carbonate some time interval is involved when the items soybean protein, guanidine carbonate and diethylene glycol had to be kept at an intermediate reaction temperature of about 125° C. to prevent excessive foaming. During this stage, maceration of the protein apparently takes place and consists of the peptization of the protein and the change of the consistency of the dispersion from a very high to a lower viscosity. Guanidine carbonate, being an inexpensive raw material, is economically used advantageously in this process. After the foaming has subsided, the dispersion can be carried to a higher temperature for adjustment of the desired viscosity.

We have discovered that in addition to diethylene glycol, which is a very suitable diluent specifically for steam-setting inks due to its high-boiling point in combination with its high hygroscopic characteristics, there are other polyhydric alcohols, such as ethylene glycol, propylene glycol, butylene glycol, dipropylene glycol, pentanediols, hexylene glycols and glycerol, which can also be used as steam-setting diluents or solvents and which can be used for making soybean protein dispersions.

Ethylene glycol can be chosen when the same high degree of hygroscopic nature has to be duplicated with a faster rate of evaporation.

Propylene glycol, butylene glycol, pentanediols, and hexylene glycols have about similar rates of evaporation as ethylene glycol but they are less hygroscopic. They and ethylene glycol, due to their faster rates of evaporation than diethylene glycol and also because they are miscible with water, can be used for both steam-setting and heat-setting printing inks. With a change from propylene glycol to the higher molecular weight simple glycols, the solubility for resins improves.

The polyglycols, such as dipropylene glycol, triethylene glycol and tetraethylene glycol, show also better solubility for resins than diethylene glycol. Their boiling points are higher and they are considerably less hygroscopic, though steam-setting remains adequate.

Glycerine is a very hygroscopic and high boiling trihydric alcohol. It can be used when about as fast an evaporation rate is desired as with triethylene glycol but with the hygroscopic characteristic even more pronounced as with diethylene glycol.

All of these polyhydric alcohols can be used with the substantially anhydrous protein dispersions and also with protein dispersions containing a limited amount of water. Too much water is not suitable for good printing characteristics; protein dispersions print well if the moisture content is as high as 20%; they print fairly well with even as high as 30%, but become unsatisfactory when the moisture content exceeds 40%. When printing inks are made with the highly hygroscopic polyhydric alcohols, it is advantageous to have them contain only small percentages of water as during printing they absorb additional moisture, which has the tendency to interfere with good printing qualities. However, with the less hygroscopic glycols, the moisture can be fairly high, as there is less tendency to absorb more of the atmospheric moisture; with pentanediol and hexylene glycol, there is even the possibility of the inks to lose some of the water content of the dispersion during the printing operation.

Besides soybean protein, there are available other vegetable proteins, such as cottonseed globulin and hempseed globulin, corn (maize) gluten protein, and proteins of animal origin, such as blood albumen, casein, gelatin or the like. The globulins of cottonseed and hempseed require about 25% more peptizing agent than soybean protein, whereas corn (maize) gluten protein, casein, blood albumen and gelatin require considerably less, such as from one third to one half less guanidine carbonate than for soybean protein.

Printing inks made from dispersions of casein and other proteins of animal origin in polyhydric alcohols set to harder films than those made from soybean protein. When the dispersions are of a high viscosity, their proteins in general possess better binding characteristics than those of lower viscosity; in addition, the high viscosity dispersions impart harder films. Though these facts are known, it is expedient with high oil absorption pigments, such as carbon black, benzidine yellow and the like, to use the lower viscosity dispersions so that enough pigment can be concentrated in the ink.

The dispersions made with guanidine carbonate are alkaline, unless acidified. Since the alkalinity is sometimes a disadvantage in a printing ink, especially those containing alkali sensitive pigments, such as Prussian blue, phosphotungstic acid toners of dyes, etc., it is advisable to make the dispersions neutral or slightly acid. The acid dispersions show a noticeable decrase in the water absorption of the dry ink films. For this reason, the acidified dispersions are preferred.

An additional decrease of water-sensitivity of dry ink films can be obtained by the incorporation of glycol soluble resins with the dispersions, such as rosin, maleic and fumaric acid modified rosin, melamine resins, phenol modified terpenes and indene-coumarones, phenol-formaldehyde resins and the like. Another approach of improving the ink film properties is the reaction of the proteins with aldehydes, isothiocyanates, and phenolic compounds or combinations of these reagents. The treatment with the alydehydes can only be carried out with the vegetable proteins or with mixtures of vegetable protein and protein of animal origin. If the dispersions of animal proteins are reacted with an aldehyde, a gel results, but if the dispersions contain as much as 30% of vegetable protein, the mixtures remain fluid when they are reacted with aldehydes.

The preparation of the substantially anhydrous protein dispersions and those containing a limited amount of water can be carried out conveniently in an open kettle provided with a cover, an anchor type agitator, thermometer and provision for indirect heating or heating by electricity. Though direct heating can be utilized also, it involves some difficulties in reheating during a plant shutdown or an interruption during the processing.

The modified process of dissolving the protein in an aqueous alkaline solution and then adding the glycols with subsequent dehydration has to be carried out in a closed kettle, provided with an agitator, thermometer and a distillation arrangement for direct or azeotropic distillation, with the latter being preferred.

These processes will be described in the following examples, in which the parts are by weight:

Example 1

20 parts of soybean protein, 3 parts of guanidine carbonate, 3 parts of dicyandiamide and 74 parts of diethylene glycol are heated, while stirring, to 125–130° C. in about 15 minutes, held at this temperature for about two hours, then carefully the temperature is raised to 140–145° C. to an apparent viscosity (measured at room temperature) of about 200 poises. This consistency is reached in about one hour.

The resulting dispersion is used in an ink by mixing and milling with 25 parts of carbon black.

Example 2

The dispersion, as prepared in Example 1, is neutralized with glacial acetic acid, requiring about 4 parts, which are added very gradually to prevent excessive foaming. After cooling, it was used in an ink by mixing and milling it with 35 parts of iron blue.

Example 3

20 parts of casein, 2 parts of guanidine carbonate, and 78 parts of diethylene glycol are heated, while stirring, for 3 hours at 80° C. Toward the end of this time, 2 parts of acetic acid are added drop by drop. After cooling, the dispersion is made into an ink with 25 parts of carbon black.

Example 4

20 parts of casein, 3 parts of guanidine carbonate, and 77 parts of diethylene glycol are heated, while stirring, for ½ hour at 110° C. Toward the end of this time, 10 parts phthalic anhydride are cautiously added to prevent excessive foaming. Then the temperature is raised to 130–140° C. in about ten minutes and held there for an hour. After cooling, the resulting vehicle is used in an ink by mixing and milling with it 30 parts of lithol red.

Example 5

30 parts casein, 3 parts of guanidine carbonate, and 67 parts of diethylene glycol are heated to 110° C. and stirred at this temperature for one hour. Then 16 parts of phthalic anhydride are gradually added and after the addition is completed, the contents are heated at 110–120° C. for an additional hour.

The vehicle is used in an ink by mixing and milling with it 30 parts of carbon black.

Example 6

20 parts of soybean protein, 4½ parts of guanidine carbonate and 75½ parts diethylene glycol were held at 125–130° C. for 1 hour, then the temperature was raised to 135° C. in ½ hour and held at this temperature for 4 hours. The resulting dispersion had an apparent viscosity of 34 poises.

Example 7

20 parts of soybean protein, 6 parts of guanidine carbonate, and 74 parts of ethylene glycol were heated at 125° C. for 2 hours. The resulting vehicle had an apparent viscosity of 16 poises.

Example 8

40 parts of soybean protein, 8 parts of guanidine carbonate and 52 parts of ethylene glycol were heated at 125° C. for 1½ hours, raised to 135° C. in ½ hour and held at this temperature for 2 hours. The resulting dispersion had an apparent viscosity of 370 poises.

Example 9

20 parts of soybean protein, 6 parts of guanidine carbonate and 74 parts of propylene glycol were heated for 2 hours at 125° C. The resulting dispersion had an apparent viscosity of 8 poises.

Example 10

20 parts of soybean protein, 6 parts of guanidine carbonate and 74 parts of glycerol were heated at 125° C. for 1 hour, raised to 135° C. in ½ hour and held at this temperature for 4 hours. The resulting dispersion had an apparent viscosity of 92 poises.

Example 11

20 parts of corn gluten protein, 4 parts of guanidine carbonate and 76 parts of glycerol were heated at 125° C. for 1 hour, raised to 135° C. in ½ hour and held at this temperature for 1 hour. The resulting dispersion had an apparent viscosity of 39 poises.

Example 12

20 parts of soybean protein, 6 parts of guanidine carbonate and 74 parts of triethylene glycol were heated at 125° C. for 1 hour, raised to 135° C. in ½ hour and held at this temperature for 1 hour. The resulting dispersion had an apparent viscosity of 210 poises.

Example 13

20 parts of casein, 3 parts of guanidine carbonate and 77 parts of triethylene glycol were heated at 120° C., for 2 hours. The resulting dispersion had an apparent viscosity of 23 poises.

Example 14

20 parts of soybean protein, 6 parts of guanidine carbonate, 6 parts of water, and 16 parts of butylene glycol were heated for 1 hour at 125° raised to 135° C. in ½ hour and held at this temperature for 4 hours. The resulting dispersion had an apparent viscosity of 125 poises.

Example 15

20 parts of soybean protein, 6 parts of guanidine carbonate dissolved in 50 parts of water, and 74 parts of dipropylene glycol were heated in a kettle, provided with an azeotropic distillation arrangement, for ½ hour at 90° C. When the contents were homogeneous, 50 parts of toluene were cautiously added and then the contents were heated to distil off water by azeotropic means. After 30 parts of water had been collected, arrangements are made to collect all of the distillate to remove the water. The remaining hydrocarbon not removable by distillation was blown out by inert gas. The resulting dispersion had an apparent viscosity of 320 poises.

Example 16

20 parts of cottonseed globulin, 6 parts of guanidine carbonate and 74 parts of diethylene glycol were heated at 125° C. for one hour, raised to 135° in ½ hour and held at this temperature for 4 hours. The dispersion had an apparent viscosity of 62 poises.

The preceding example was made with the minimum amount of peptizing agent for the formation of a homogeneous dispersion, whereas Example 6 was made with the minimum amount required for soybean protein. In the latter example, this proportion is 4½ parts of guanidine carbonate to 20 parts of soybean protein with 75½ parts of diethylene glycol. In all other examples, a larger amount of guanidine carbonate than the minimum required was used. It had been noticed that with cottonseed globulin and hempseed globulin noticeably larger amounts of peptizing agents were needed than with soybean protein. The viscosities in the respective examples were found to be substantially higher. There was little difference between cottonseed and hempseed globulin.

Example 17

20 parts of corn (maize) gluten protein, 3 parts of guanidine carbonate, and 77 parts of diethylene glycol were heated to 125° C. and held at this temperature for ½ hour. Then the temperature was raised in 15 minutes to 135° C. and held there for 3½ hours. The resulting dispersion had an apparent viscosity of 18 poises.

This example demonstrates that about 3 parts of guanidine carbonate is the minimum amount for peptization of maize gluten protein, whereas for soybean protein, as shown in Example 6, the minimum was about 4½ parts of guanidine carbonate under similar conditions. Dispersions made with other glycols showed that either lower viscosities were obtained when the same amount of dispersing agent was used as with soybean protein or that a 33⅓% to 50% decrease in the amount of guanidine carbonate would give similar consistencies.

Example 18

20 parts of blood albumen, 2½ parts of guanidine carbonate, and 77½ parts of diethylene glycol were heated at 125° C. for ½ hour, raised to 135° in ¼ hour and held at this higher temperature for 2½ hours. The resulting dispersion had an apparent viscosity of 51 poises.

This example demonstrates that 2½ parts had been found to be the minimum of guanidine carbonate required for peptization of blood albumen for the chosen reaction range of temperature and time. It is substantially smaller than that required for soybean protein.

Example 19

20 parts gelatin (broken up into small particles), 2 parts of guanidine carbonate, and 78 parts of diethylene glycol were heated at 80° C. for 3 hours. The resulting dispersion had an apparent viscosity of 14 poises.

In the previous example, it has been demonstrated that but a small amount of peptizing agent is required for the dispersion of gelatin, an animal proteinaceous substance, obtained by the maceration of connective animal tissues. Though for this purpose the better grades of gelatin can be used with good results, it is more economical to use the material which has not been refined.

It has been shown in Examples 3, 4, 5, 18 and 19, that the proteins of animal origin can be converted into dispersions in glycols and glycerol. In each case, it has been shown that either the amount of peptizing agent, the temperature, and the reaction time can be shortened for these proteins or that a combination of the advantages can be combined in order to get suitable dispersions. Like casein, the other proteins of animal origin can be used for printing inks, as has been shown in several examples. In these printing inks, the pigment shown can be replaced by other pigments, such as iron blues, benzidine yellow, toluidine toners, phthalocyanine blue, chrome yellow and the like. In many instances, for the same amount of pigment the proportion of dispersion might have to be changed but this is apparent as the oil absorption of the dry colors differs for each and every one. These changes are made as a "matter-of-fact" by technicians familiar in the art of paint and printing ink manufacturing.

The maize gluten protein also requires a substantially smaller proportion of guanidine carbonate. It behaves similarly as the proteins of animal origin. Its dispersions can be used for printing inks like those of soybean protein or the proteins of anmal origin.

The globulins of hempseed and cottonseed can also be used for printing inks. They have been found to require more of the dispersing agent than the soybean protein and proteins of animal origin. They have been used in printing inks, which showed steam-setting characteristics like those made from the other proteins.

We have also found that dispersions can be made with other carbonates of nitrogen containing compounds, such as ammonium carbonate, the carbonates of the amines, and the carbonates of iminoamides other than that of guanidine carbonate, such as guanylurea, derivatives of guanidine and guanylurea. These dispersions have also been used in printing inks.

Since these dispersions of proteins in polyhydric alcohols have very good water tolerance, inks made with them can be printed on wet paper. They are very useful for printing on paper webs which prior to printing have been wet so that a subsequent exposure to an elevated temperature does not embrittle the paper by an excessive loss of moisture.

In Example 2, the neutralization of the protein dispersion has been done with glacial acetic acid. All of the protein dispersions can be treated this way, but instead of glacial acetic acid, some other acid may be used, such as pentanoic, hexanoic, linseed oil fatty acid, cottonseed oil fatty acid, rosin, fumaric and maleic acid modified rosin, fumaric and maleic acid modified terpenes, fumaric and maleic acid modified unsaturated fatty acids, and the like. Instead of the 4 parts of glacial acetic acid, larger proportions can be used of acetic acid or its substitutes. The maleic acid modified rosins and terpenes are known steam-setting resins. Their film forming characteristics, their water tolerance, and pigment wetting characteristics can be improved by mixing them with either the alkaline or acidified steam-setting protein dispersions. In the following example, showing such a mixture, the fumaric acid modified rosin may be substituted by a maleic acid modified rosin or the corresponding anhydride, fumaric acid or maleic acid or maleic anhydride modified terpenes, or the like:

Example 20

50 parts of a dispersion made according to Example 1, 50 parts of a 50% solution of fumaric acid modified rosin in diethylene glycol, and 30 parts of lithol red are mixed well, and the mixture was passed over a three roller mill until homogeneous. The resulting ink had good water tolerance; at a humidity close to 100%, it performed well on the printing press, and it set readily when its prints were exposed to steam.

With the polyglycols, such as dipropylene glycol and tetraethylene glycol, and the simple glycols with 4 carbon atoms or more per molecule, either greater amounts of dispersing agents or the presence of water is advisable for the formation of the dispersions of alcohol-insoluble proteins.

Example 21

20 parts of soybean protein, 15 parts of guanidine carbonate, and 65 parts of tetraethylene glycol were heated at 125° C. for one hour, raised to 135° C. in ½ hour and held at this temperature for 3 hours. The resulting dispersion had an apparent viscosity of 86 poises.

Example 22

20 parts of cottonseed globulin, 20 parts of guanidine carbonate, and 60 parts of tetraethylene glycol were heated for two hours at 125° C., raised to 135° C. in ½ hour and held at this temperature for 2 hours. The resulting dispersion had an apparent viscosity of 93 poises.

Example 23

20 parts of soybean protein, 6 parts of guanidine carbonate, 6 parts of water, and 68 parts of butylene glycol were heated at 125° C. for 2 hours and then at 135° C. for six hours. The resulting dispersion had an apparent viscosity of 118 poises.

Example 24

20 parts of powdered gelatin, 4 parts of guanidine carbonate, 6 parts of water, and 68 parts of butylene glycol were heated at 125° C. for 6 hours. The resulting dispersion had an apparent viscosity of 23 poises.

Example 25

20 parts corn gluten protein, 4 parts of guanidine carbonate, 6 parts of water, and 70 parts of butylene glycol were heated at 125° C. for ½ hour and later for 4 hours at 135° C. The resulting dispersion had an apparent viscosity of 65 poises.

Example 26

20 parts of cottonseed globulin, 8 parts of guanidine carbonate, 8 parts of water, and 64 parts of butylene glycol were heated to 125° C., held at this temperature for one hour and then heated at 135° C. for 8 hours. The resulting dispersion had an apparent viscosity of 234 poises.

Example 27

20 parts of hempseed globulin, 8 parts of guanidine carbonate, 8 parts of water, and 64 parts of butylene glycol were heated at 125° C. for one hour and then for 8 hours at 135° C. The resulting dispersion had an apparent viscosity of 195 poises.

Example 28

20 parts of casein, 4 parts of guanidine carbonate, 8 parts of water, and 68 parts of butylene glycol were heated for one hour at 125° C. and then for 2 hours at 135° C. The resulting dispersion had an apparent viscosity of 230 poises.

Example 29

20 parts of blood albumin, 6 parts of guanidine carbonate, 6 parts of water, and 68 parts of butylene glycol were heated at 125° C. for 1 hour and then for 3 hours at 135° C. The resulting dispersion had an apparent viscosity of 133 poises.

Example 30

20 parts of soybean protein, 6 parts of guanidine carbonate, 8 parts of water, and 68 parts of pentanediol were heated at 125° C. for 1 hour and then at 140° C. for 8 hours. The resulting dispersion had an apparent viscosity of 49 poises.

Example 31

20 parts of casein, 6 parts of guanidine carbonate, 8 parts of water, and 66 parts of pentanediol were heated for 1 hour at 125° C. and then for 8 hours at 140° C. The resulting dispersion had an apparent viscosity of 38 poises.

Example 32

20 parts of protein of soybean, 8 parts of guanidine carbonate, and 42 parts of ethylene glycol were heated for one hour, then 10 parts more of soybean protein were added and the contents were heated to 135° C. and held at this temperature for 1 hour, after which 10 additional parts of soybean protein were added and held for two hours more at 135° C.

The resulting dispersion was mixed with 100 parts of hexylene glycol, and 250 parts of chrome yellow pigment. The mixture was made homogeneous on a three roller ink mill. The resulting ink had a good press stability at a high humidity, and its prints set readily upon exposure to steam.

Example 33

40 parts of casein, 8 parts of guanidine carbonate, and 62 parts of ethylene glycol were heated at 110° C. for 16 hours. The resulting dispersion was mixed with 100 parts of a 66% rosin solution in hexylene glycol and 250 parts of chrome yellow pigment. The mixture was made homogeneous on a three roller ink mill. The resulting ink had a good press stability at a humidity of 95%, and its prints set quickly upon exposure to steam.

In place of rosin, some other glycol-soluble resin can be added to the protein dispersion, or instead of a resin, a reactive material, such as phenol, naphthol, their derivatives, such as cresol, butyl phenol, or the like, phenol-formaldehyde resins, phenol-modified terpenes, indenes, coumarones, or the like, can be used. The resins will increase the water resistance of the dry ink films.

When the acid or alkaline dispersions of the alcohol-insoluble proteins are mixed with dispersions of zein, the otherwise great tendency of zein to gel spontaneously is greatly diminished. This property of zein has alway been a great obstacle for utilizing this excellent film-forming protein. The gelling tendency is more severe in pigment pastes, but it was found absent when the pigment pastes were made with a mixture of zein dispersion and dispersion of an alcohol-insoluble protein when as much as 30 to 60% of the zein was replaced by the latter. Inks made with chrome yellow, cadmium yellow, Prussian blue, lithol red and toluidine toner with mixtures of these dispersions showed no signs of gelling after one year; they had remained of a printable consistency.

In the preparation of the dispersions, other carbonates of alkaline nitrogen-containing compounds can be substituted for guanidine carbonate, with similar results. Instead of elevated temperatures during the preparation of the dispersions, room temperature or slightly elevated temperatures are sufficient for the preparation of dispersions of the alcohol-insoluble proteins in ethylene glycol, requiring about ten hours of agitation. With propylene glycol and diethylene glycol, it is advisable to have a small percentage of water present; in addition a longer agitation period is required. These dispersions can be mixed with rosin or other resins. Though rosin forms unstable solutions in dipropylene glycol, butylene glycol, or the like, mixtures of rosin and the protein dispersions form homogeneous systems with either the freshly prepared homogeneous rosin solution or the already crystallized out, heterogeneous rosin-glycol mixture when the dispersion and the rosin composition are mixed.

While the compositions described constitute the preferred embodiments of this invention, it is to be understood that the invention is not limited to such precise embodiments and that changes may be made therein without departing from the scope of the invention, as defined and described in the appended claims.

What is claimed is:

1. A printing ink vehicle consisting essentially of a dispersion of a binder, a protein peptizing agent and a substantially anhydrous hygroscopic liquid, said binder consisting essentially of a dry, substantially anhydrous, non-prolamine animal protein having high water tolerance and being dispersible in guanidine carbonate, said protein being dispersed by the action of guanidine carbonate, said liquid consisting essentially of a polyhydric alcohol having 2–3 hydroxy groups and 2–8 carbon atoms, said printing ink vehicle having a high humidity and water tolerance and being readily settable on exposure to steam.

2. The printing ink vehicle set forth in claim 1 wherein the protein comprises casein.

3. The printing ink vehicle set forth in claim 1 wherein the protein comprises blood albumen.

4. The printing ink vehicle set forth in claim 1 wherein the protein comprises gelatin.

5. A printing ink consisting of coloring matter in a dispersion of a resin binder, a protein binder, a protein peptizing agent and a substantially anhydrous hygroscopic liquid, said binder consisting essentially of a dry, substantially anhydrous non-prolamine animal protein having high water tolerance and being dispersible in guanidine carbonate, said protein being dispersed by the action of guanidine carbonate, and said liquid consisting essentially of a polyhydric alcohol having from 2 to 3 hydroxy groups and 2 to 8 carbon atoms, said printing ink having a high humidity and water tolerance and being readily settable on exposure to steam.

6. The printing ink set forth in claim 5 wherein the protein comprises casein.

7. The printing ink set forth in claim 5 wherein the protein comprises blood albumen.

8. The printing ink set forth in claim 5 wherein the protein comprises gelatin.

ALFRED F. SCHMUTZLER.
DONALD F. OTHMER.

REFERENCES CITED

The following references are of record in the file of this patent:

UNITED STATES PATENTS

| Number | Name | Date |
| --- | --- | --- |
| 1,930,178 | Mizener | Oct. 10, 1933 |
| 2,185,110 | Coleman | Dec. 26, 1939 |
| 2,322,927 | Drewsen et al. | June 29, 1943 |
| 2,332,066 | Erickson | Oct. 29, 1943 |
| 2,366,970 | Kroeger | Jan. 9, 1945 |
| 2,453,752 | La Piana | Nov. 16, 1948 |

OTHER REFERENCES

"The Chemical Trade Jour. and Chem. Eng.," Sept. 29, 1939, p. 268.